US005695591A

United States Patent [19]
Hamada et al.

[11] Patent Number: 5,695,591
[45] Date of Patent: Dec. 9, 1997

[54] APPARATUS AND METHOD FOR MANUFACTURING LAMINATED PRODUCT BY PRESS

[75] Inventors: Shuichi Hamada, Kobe; Takashi Akiyama, Osaka, both of Japan

[73] Assignee: Matsushita Electric Industrial Co., Ltd., Kadoma, Japan

[21] Appl. No.: 399,211

[22] Filed: Mar. 6, 1995

[30] Foreign Application Priority Data

Mar. 7, 1994 [JP] Japan ................ 6-035516

[51] Int. Cl.⁶ .................................... B32B 31/00
[52] U.S. Cl. ............... 156/272.8; 156/261; 156/273.7; 156/379.8; 156/513; 219/121.63; 219/121.64; 219/121.85
[58] Field of Search ................ 156/261, 272.8, 156/273.7, 379.8, 513, 517; 219/121.6, 121.63, 121.64, 121.85, 121.86

[56] References Cited

U.S. PATENT DOCUMENTS

| | | | |
|---|---|---|---|
| 3,520,055 | 7/1970 | Jannett | 219/121.86 X |
| 4,644,129 | 2/1987 | Miller | 219/121.63 |
| 5,053,601 | 10/1991 | Landtwing et al. | 219/121.63 |
| 5,151,149 | 9/1992 | Swartz | 156/379.8 |
| 5,171,962 | 12/1992 | Sakanishi | 219/121.64 |
| 5,216,616 | 6/1993 | Masters | 156/272.8 |
| 5,418,350 | 5/1995 | Fremeaux et al. | 219/121.64 |

Primary Examiner—David A. Simmons
Assistant Examiner—Paul M. Rivard
Attorney, Agent, or Firm—Wenderoth, Lind & Ponack

[57] ABSTRACT

An apparatus and a method are disclosed for manufacturing a laminated product. The method includes the steps of punching out components from a plate with a punch and a die and accommodating the punched components in a component accommodating cylindrical member, emitting a laser beam with a laser beam emitting device to a portion between adjacent components. The components are laminated, one on the other, in the component accommodating cylindrical member. The laser beam passes through a beam passage hole formed in the peripheral surface of the component accommodating cylindrical member. The beam passage hole is located through a predetermined rotational angle range of the component accommodating cylindrical member so as to weld the components to manufacture the laminated product. Also, the die and the component accommodating cylindrical member are rotated by a predetermined angle during the welding operation.

12 Claims, 2 Drawing Sheets

APPARATUS AND METHOD FOR MANUFACTURING LAMINATED PRODUCT BY PRESS

BACKGROUND OF THE INVENTION

The present invention relates to an apparatus and a method for manufacturing a laminated product such as a motor core.

An example of a conventional apparatus for manufacturing a laminated product is described below with reference to FIG. 4. The apparatus comprises a punch 11; a die 12; a component-accommodating cylindrical member 13; a laser beam 14; a beam passage hole 15 formed in the punch 11; a plate 16; and pressed components 17 formed by punching the plate 16 by the punch 11 and the die 12. The die 12 and the components/accommodating cylindrical member 13 rotate at a predetermined angle in a direction for each vertical movement of the punch 11.

The operation of the apparatus having the above-described construction is described below. As shown in FIG. 4, the pressed components 17 are formed by punching the plate 16 one after another by the punch 11 and the die 12. The pressed components 17 are laminated one on the other in the die 12 and in the components/accommodating cylindrical member 13 and welded to each other by the laser beam 14. Welded portions are shown by P. Since the die 12 and the components/accommodating cylindrical member 13 rotate at a predetermined angle in a direction for each vertical movement of the punch 11, the welded portions P form a spiral line rather than a vertically straight line.

In the conventional apparatus, however, it is necessary to form the beam passage hole 15 in the punch 11. The formation of the beam passage hole 15 leads to low strength of the punch 11, and hence low press performance.

SUMMARY OF THE INVENTION

Accordingly, an object of the present invention is to provide an apparatus and a method for manufacturing a laminated product with a press. The above are capable of preventing low punch strength which results in low press performance.

In accomplishing these and other objects, according to one aspect of the present invention, there is provided an apparatus for manufacturing a laminated product by press, comprising:

a punch;

a die rotating by a predetermined angle in unison with each upward and downward movement of the punch and punching out pressed components from a plate by cooperating with the punch;

a component/accommodating cylindrical member rotating together with the die and accommodating the pressed components punched out by the punch and the die, the component-accommodating cylindrical member having a beam passage hole formed on a peripheral surface thereof in a predetermined rotational angle range to be welded; and a laser beam emitting device which emits a laser beam to a portion between the pressed components, adjacent to each other, laminated one on the other in the component-accommodating cylindrical member through the hole to weld the pressed components to manufacture the laminated product.

According to another aspect of the present invention, there is provided a method for manufacturing a laminated product, comprising steps of:

punching out pressed components from a plate cooperating with a punch and a die and accommodating the punched components in a component-accommodating cylindrical member;

emitting by a laser beam emitting means a laser beam to a portion between the pressed components, adjacent to each other, laminated one on the other in the component-accommodating cylindrical member through a beam passage hole of the component-accommodating cylindrical member which is formed on a peripheral surface thereof in a predetermined rotational angle range to be welded, so as to weld the pressed components to manufacture the laminated product; and rotating the die and the component-accommodating cylindrical member by a predetermined angle for sequential welding operations.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
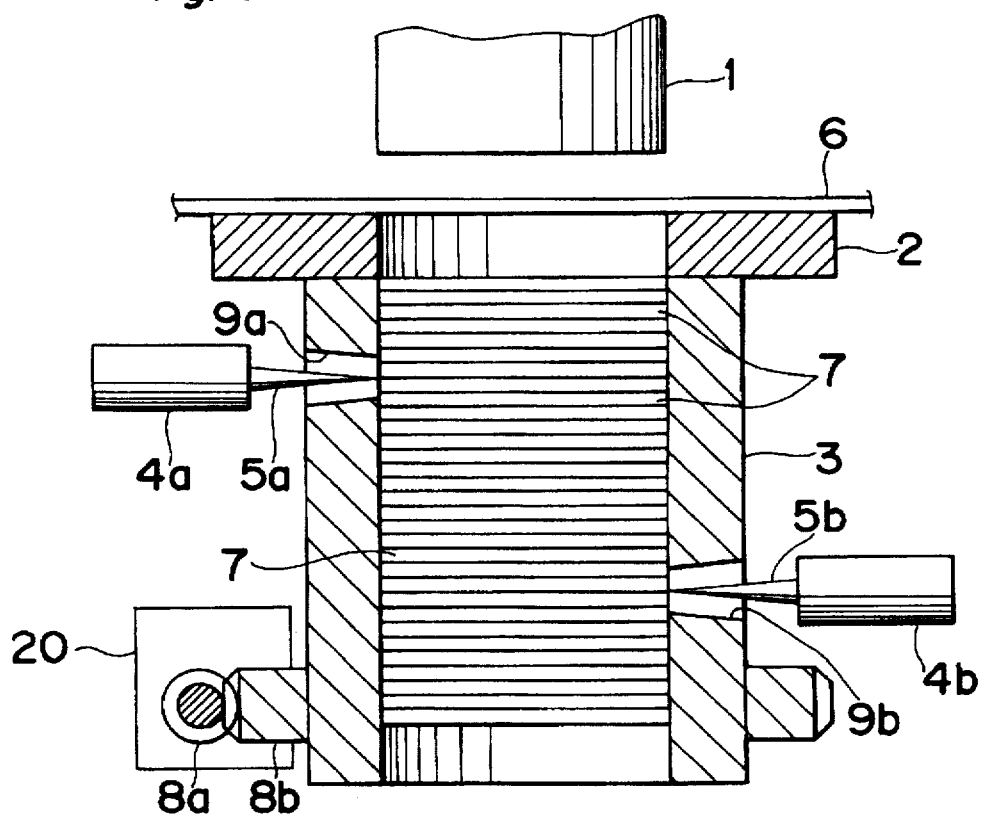
FIG. 1 is a sectional view showing an apparatus for manufacturing a laminated product according to an embodiment of the present invention.

Before the description of the present invention proceeds, it is to be noted that like parts are designated by like reference numerals throughout the accompanying drawings.

Figure 2:
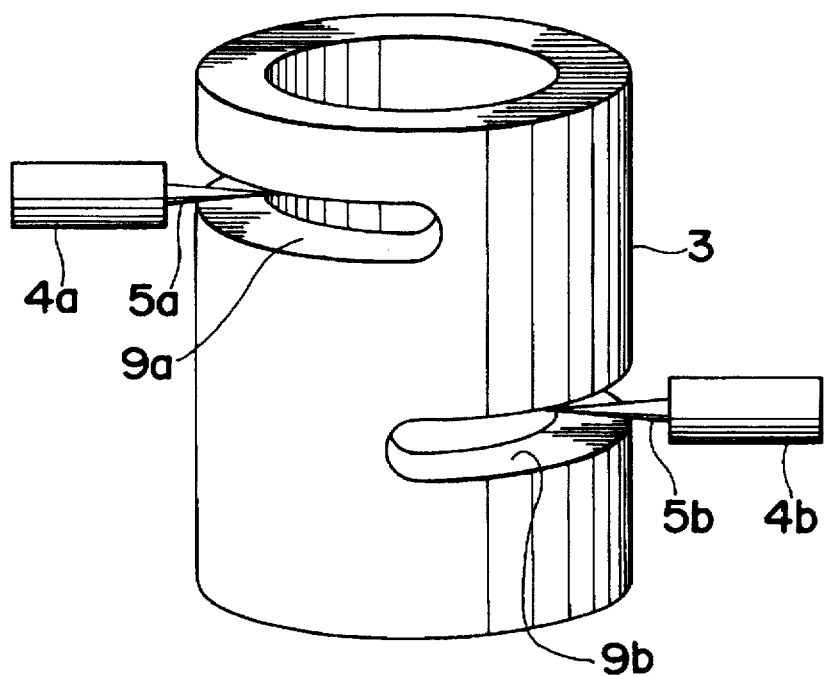
FIG. 2 is a perspective view showing a pressed components-accommodating cylindrical member.

An apparatus for manufacturing a laminated product according to an embodiment of the present invention is described below with reference to FIGS. 1 through 3. Referring to FIGS. 1 and 2, the apparatus comprises a punch 1; a die 2; a component-accommodating cylindrical member 3; laser beam emitting means 4a and 4b; laser beams 5a and 5b; a metal plate 6; pressed components 7 formed by punching the plate 6 by means of the punch 1 and the die 2. The die 2 and the component-accommodating cylindrical member 3 are integral with each other and rotate through a predetermined angle in a direction for each vertical movement of the punch 1. The die and cylindrical member 3 are driven by a driving means comprising a motor 20, a worm 8a connected to the motor 20, and a worm wheel 8b engaged with the worm 8a.

A pair of upper and lower beam passage holes 9a and 9b is formed in the peripheral surface of the component-accommodating cylindrical member 3 and extend in a direction perpendicular to the axial direction of the cylindrical member 3. Each of the beam passage holes 9a and 9b is positioned in a rotational angle range of approximately 180° so as not to overlap each other. As shown in FIG. 3, welded points P1 and P2 of a press-laminated product (A) form a spiral line in a spiral angle of 360°. The laser beam emitting means 4a and 4b are provided in correspondence to the beam passage holes 9a and 9b, respectively.

The operation of the apparatus is described below. As shown in FIG. 1, the pressed components 7 are formed by sequentially punching the plate 6 with the punch 1 and the die 2. The components 7 are laminated one on the other in the die 2 and in the pressed components-accommodating cylindrical member 3. The inner diameter of the die 2 and that of the component-accommodating cylindrical member 3 are set such that they closely engage the peripheral surface of the pressed components 7. Thus, the pressed components 7 can be prevented from being dropped, and a back pressure is applied to the pressed components 7. The pressed components 7 are moved downward because they are pressed by the punch 1 in a pressing operation and at the same time, the die 2 and the pressed component-accommodating cylindrical member 3 rotate at a predetermined angle in a direction for each vertical movement of the punch 1. The pressed components 7 rotate in correspondence to the rotation of the die 2 and the pressed component-accommodating cylindrical member 3. When the lowermost pressed components 7 has reached the beam passage hole 9a, the beam emitting means 4a is actuated. The beam emitting means 4a emits the laser beam 5a into the beam passage hole 9a so as to irradiate a portion between adjacent pressed components 7. In this manner, the adjacent pressed components 7 are welded to each other. In the same manner, the remaining pressed components 7 are welded to each other. Welded points P1 form a spiral line in a spiral angle range of approximately 180°, as shown in FIG. 3. When an unwelded portion of the pressed components 7 has reached the beam passage hole 9b a certain period of time after the above-described welding operation is completed through the beam passage hole 9a, the beam emitting means 4b emits the laser beam 5b into the beam passage hole 9b so as to carry out a subsequent welding operation. As in the case of the welded point P1, welded points P2 form a spiral line in the range of a spiral angle of approximately 180°, as shown in FIG. 3. In this manner, the press-laminated product (A) having the welded points P1 and P2 in the range of a spiral angle of approximately 360° is obtained.

Figure 3:
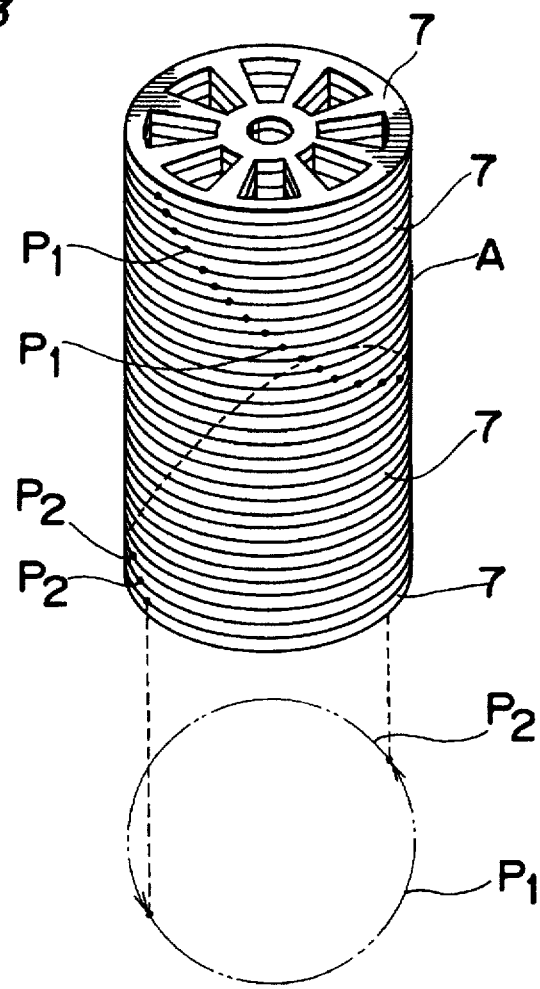
FIG. 3 is a perspective view showing an example of a press-laminated product.
Figure 4:
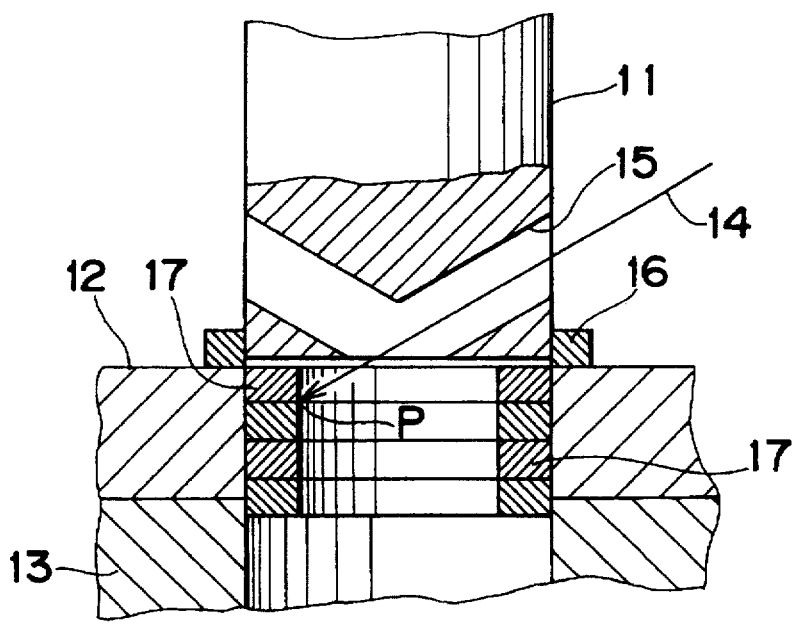
FIG. 4 is a sectional view showing a conventional apparatus for manufacturing a laminated product by press.

FIG. 3 shows an example of a motor core as the press-laminated product (A). Needless to say, various types of press-laminated products (A) can be obtained with the above-described apparatus. In some cases, one beam passage hole and one laser beam emitting means corresponding thereto may be sufficient for welding the pressed components 7 to each other if a range to be welded is approximately 180° or less than 180° in a spiral angle.

In a specific example, the metal plate 6 made of electromagnetic steel plate with 0.3 mm thickness is firstly punched out by the downward movement of the punch 1. Then, the punch 1 is moved upward and the laser beams 5a, 5b are emitted to the portions between the pressed components 7 in the cylindrical member 3 through the holes 9a, 9b by the beam emitting means 4a, 4b such as YAG lasers at 2.5 J per one pulse and welded at the welded points P1 and P2. The spot diameter of each laser beam is 0.4 mm. After welding,, the cylindrical member 3 is rotated by 7 degree together with the die 2. The inner diameter of the cylindrical member 3 is less than the outer diameter of the pressed components 7 by 0.01 mm to apply a back pressure to the pressed components 7.

The welding operation is not limited to the period of time of upward movement of the punch 1, or before rotating the cylindrical member 3 and the die 2, but can be performed at any time when the pressed components 7 are steady in the cylindrical member 3 after or before rotating the cylindrical member 3 and the die 2.

In order to apply a back pressure to the pressed components 7 by the cylindrical member 3, the inner diameter of the cylindrical member 3 is equal to or less than the outer diameter of the pressed components 7. The ranges of the holes 9a, 9b can be overlapped each other if necessary. The range of each hole 9a, 9b can be formed at any angle, and the number of the holes and beam emitting means can be selected in accordance with the welding operation. A YAG laser or $CO_2$ laser can be used as the beam emitting means.

According to the above-described construction, the pressed components formed by punching a plate with the punch and the die are pressed downward by the punch which moves downward and hence the pressed components are moved downward while they are being laminated one on the other in the die and the pressed components-accommodating cylindrical member. The die and the pressed component-accommodating cylindrical member rotate intermittently, for example, during upward movement of the punch after the downward movement thereof. When the pressed components in the component-accommodating cylindrical member have been pressed to the position of each beam passage hole, the pressed components adjacent to each other are welded to each other. Welded points form a spiral line due to the downward movement of the pressed components and the rotation of the component-accommodating cylindrical member. Because the beam passage holes are formed in a predetermined rotational angle range requiring welding, the operation for welding the pressed components to each other can be smoothly accomplished by using the laser beams.

If necessary, a plurality of beam passage holes is formed in the peripheral surface of the component-accommodating cylindrical member such that the positions thereof are different from each other in the circumferential and axial direction of the component-accommodating cylindrical member. In addition, the laser beam emitting means for emitting laser beams into each beam passage hole are also correspondingly arranged. Thus, the pressed components are welded to each other throughout a rotational angle range of 360°. Further, a press-laminated product having the welded points in the range of a spiral angle of more than 360° can be obtained.

In the apparatus having the above-described construction, the beam passage holes are formed in the peripheral surface of the pressed component-accommodating cylindrical member which does not adversely affect the pressing performance of the apparatus, unlike the conventional apparatus having the beam passage holes formed in the punch. Thus, the apparatus has a higher pressing performance than the conventional apparatus. Therefore, the construction prevents the strength of the punch from being deteriorated and allows the press performance to be improved.

According to the present invention, pressed components are laminated one on the other by fixing them at welded points forming a spiral line. Thus, the pressed components can be manufactured with high efficiency, the strength of the punch can be prevented from being deteriorated, and the press performance can be improved. Moreover, the laser beam is not emitted inside of the pressed components unlike the conventional apparatus, and it is unnecessary to make a special hole for passing the beam to the pressed components. Thus, the pressed component can be designed in any shape.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An apparatus for manufacturing a laminated product, said apparatus comprising:

a reciprocating punch;

a die aligned with said punch and rotatable through a predetermined angle in synchronism with reciprocating movement of said punch;

a hollow component accommodating cylindrical member connected to and rotatable with said die, said component accommodating cylindrical member having first and second through holes formed in a peripheral surface thereof, wherein said through holes extend through a predetermined rotational angle of said component accommodating cylindrical member such that said first and second through holes are circumferentially and axially spaced along said component accommodating cylindrical member; and first and second laser beam emitting devices aligned with said through first and second through holes in said component accommodating cylindrical member for emitting laser beams, respectively, such that said first and second laser beam devices are not rotated when said component accommodating cylindrical member is rotated.

2. The apparatus as claimed in claim 1, wherein said component accommodating cylindrical member has an inner diameter which is not larger than an inner diameter of said die so that the components formed by said punch and said die can be tightly held in said component accommodating cylindrical member.

3. The apparatus as claimed in claim 1, further comprising a rotating means for rotating said die and said component accommodating cylindrical member.

4. The apparatus as claimed in claim 3, wherein said rotating means comprises:

a motor having a worm; and a worm wheel positioned on said component accommodating cylindrical member, wherein said worm drivingly engages said worm wheel.

5. The apparatus as claimed in claim 3, wherein said first and second laser beam emitting devices together with said rotating means defines means for welding a spiral line of welds along a stack of components in said component accommodating cylindrical member.

6. A method for manufacturing a laminated product, the method comprising:

punching out components from a plate with a punch and a die, and accommodating the punched components in a component accommodating cylindrical member;

emitting a laser beam through a first beam passage hole of the component accommodating cylindrical member, to a location between adjacent components in said component accommodating cylindrical member, so that the components are laminated one on the other in the component accommodating cylindrical member, wherein the first beam passage hole extends through a 180 degree rotational angle of the component accommodating cylindrical member in order to weld the components together;

emitting a laser beam through a second beam passage hole of the component accommodating cylindrical member to a location between adjacent components in said component accommodating cylindrical member, so that the components are laminated one on the other in the component accommodating cylindrical member, wherein the second beam passage hole extends through a 180 degree rotational angle of the component accommodating cylindrical member in order to weld the components together; and rotating, relative to stationary laser beam emitting devices, the die and the component accommodating cylindrical member through a predetermined angle for sequentially performing a welding operation.

7. The method as claimed in claim 6, wherein after said punching step, said rotating step and said emitting steps are carried out sequentially.

8. The method as claimed in claim 6, wherein during said emitting steps, laser beams are emitted by laser beam emitting means to an area between adjacent components through the first and second beam passage holes formed through a peripheral wall of the component accommodating cylindrical member such that the passage holes are circumferentially and axially spaced along the component accommodating cylindrical member.

9. The method is claimed in claim 6, wherein following said punching step, the components are accommodated in the component accommodating cylindrical member which has an inner diameter which is not larger than an outer diameter of the components in order to tightly hold the components in the component accommodating cylindrical member.

10. The method as claimed in claim 6, wherein a sequence of emitting steps forms welding points located in a spiral line on a stack of components.

11. The method as claimed in claim 6, wherein in said emitting steps, laser beams are emitted by laser beam emitting means through the first and second beam passage holes which are axially and circumferentially spaced along the component accommodating cylindrical member such that welded points are formed in a range of approximately 360°.

12. The apparatus as claimed in claim 1, wherein each of said first and second through holes extends through a rotational angle of 180 degrees, and said first and second through holes are positioned so as to not overlap each other.

* * * * *